(12) United States Patent  (10) Patent No.: US 9,411,390 B2
Smith et al.  (45) Date of Patent: Aug. 9, 2016

(54) INTEGRATED CIRCUIT DEVICE HAVING POWER DOMAINS AND PARTITIONS BASED ON USE CASE POWER OPTIMIZATION

(75) Inventors: Brian Smith, Mountain View, CA (US); Parthasarathy Sriram, San Francisco, CA (US); Stephane Le Provost, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 797 days.

(21) Appl. No.: 12/029,404

(22) Filed: Feb. 11, 2008

(65) Prior Publication Data

US 2009/0201082 A1   Aug. 13, 2009

(51) Int. Cl.
G06F 1/32  (2006.01)

(52) U.S. Cl.
CPC ............ G06F 1/3203 (2013.01); G06F 1/3287 (2013.01); Y02B 60/1282 (2013.01)

(58) Field of Classification Search
CPC .. G06F 1/3203; G06F 1/3287; Y02B 60/1282
USPC ......................................... 713/321, 322, 324
See application file for complete search history.

(56) References Cited

U.S. PATENT DOCUMENTS

| | | |
|---|---|---|
| 4,868,832 A | 9/1989 | Marrington et al. |
| 5,220,660 A | 6/1993 | Yoshizawa et al. |
| 5,339,445 A | 8/1994 | Gasztonyi |
| 5,471,189 A | 11/1995 | Dietz et al. |
| 5,510,740 A | 4/1996 | Farrell et al. |
| 5,517,441 A | 5/1996 | Dietz et al. |
| 5,530,845 A | 6/1996 | Hiatt et al. |
| 5,586,308 A | 12/1996 | Hawkins et al. |
| 5,588,099 A | 12/1996 | Mogilevsky et al. |
| 5,649,222 A | 7/1997 | Mogilevsky |
| 5,659,687 A | 8/1997 | Kim et al. |
| 5,687,382 A | 11/1997 | Kojima et al. |
| 5,737,613 A | 4/1998 | Mensch, Jr. |

(Continued)

FOREIGN PATENT DOCUMENTS

| | | |
|---|---|---|
| GB | 2457170 | 8/2009 |
| WO | 20040102623 | 11/2004 |

OTHER PUBLICATIONS

Application as Filed; U.S. Appl. No. 12/101,028; Brian Smith; et al., filed Apr. 10, 2008.

(Continued)

Primary Examiner — Thuan Du

(57) ABSTRACT

A programmable SoC (system on a chip) having optimized power domains and power islands. The SoC is an integrated circuit device including a plurality of power domains, each of the power domains having a respective voltage rail to supply power to the power domain. A plurality of power islands are included within the integrated circuit device, wherein each power domain includes at least one power island. A plurality of functional blocks are included within the integrated circuit device, wherein each power island includes at least one functional block. Each functional block is configured to provide a specific device functionality. The integrated circuit device adjusts power consumption in relation to a requested device functionality by individually turning on or turning off power to a selected one or more power domains, and for each turned on power domain, individually power gating one or more power islands.

22 Claims, 6 Drawing Sheets

(56) References Cited

U.S. PATENT DOCUMENTS

| | | | |
|---|---|---|---|
| 5,758,133 A | 5/1998 | Evoy | |
| 5,862,368 A | 1/1999 | Miller et al. | |
| 5,889,529 A | 3/1999 | Jones et al. | |
| 6,029,170 A | 2/2000 | Garger et al. | |
| 6,040,845 A | 3/2000 | Melo et al. | |
| 6,061,679 A | 5/2000 | Bournas et al. | |
| 6,134,167 A | 10/2000 | Atkinson | |
| 6,163,583 A | 12/2000 | Lin et al. | |
| 6,169,546 B1 | 1/2001 | Bogdan | |
| 6,169,984 B1 | 1/2001 | Bogdan | |
| 6,191,969 B1 | 2/2001 | Pereira | |
| 6,191,970 B1 | 2/2001 | Pereira | |
| 6,212,645 B1 | 4/2001 | Tjandrasuwita | |
| 6,216,234 B1 | 4/2001 | Sager et al. | |
| 6,243,280 B1 | 6/2001 | Wong et al. | |
| 6,249,284 B1 | 6/2001 | Bogdan | |
| 6,380,764 B1 | 4/2002 | Katoh et al. | |
| 6,397,340 B2 | 5/2002 | Watts, Jr. et al. | |
| 6,493,856 B2 | 12/2002 | Usami et al. | |
| 6,538,947 B2 | 3/2003 | Ahmed et al. | |
| 6,584,003 B1 | 6/2003 | Kim et al. | |
| 6,600,575 B1 | 7/2003 | Kohara | |
| 6,678,831 B1 | 1/2004 | Mustafa et al. | |
| 6,728,959 B1 | 4/2004 | Merkey | |
| 6,754,837 B1 | 6/2004 | Helms | |
| 6,762,768 B2 | 7/2004 | Dilliplane | |
| 6,768,659 B2 | 7/2004 | Gillingham et al. | |
| 6,775,776 B1 | 8/2004 | Vogt et al. | |
| 6,804,267 B1 | 10/2004 | Long et al. | |
| 6,816,809 B2 | 11/2004 | Circenis | |
| 6,845,456 B1 | 1/2005 | Menezes et al. | |
| 6,901,298 B1 | 5/2005 | Govindaraj et al. | |
| 6,990,594 B2 | 1/2006 | Kim | |
| 7,007,247 B1 | 2/2006 | Wang et al. | |
| 7,043,649 B2 | 5/2006 | Terrell, II | |
| 7,058,834 B2 | 6/2006 | Woods et al. | |
| 7,100,013 B1 | 8/2006 | de Waal | |
| 7,174,472 B2 | 2/2007 | Hill | |
| 7,187,205 B2 | 3/2007 | Ramaraju et al. | |
| 7,256,232 B2 | 8/2007 | Lamaze et al. | |
| 7,414,550 B1 | 8/2008 | Sudharsanan | |
| 7,434,072 B2 * | 10/2008 | Peirson et al. | 713/300 |
| 7,518,399 B1 | 4/2009 | Santurkar et al. | |
| 7,529,958 B2 * | 5/2009 | Roth et al. | 713/330 |
| 7,590,815 B1 | 9/2009 | de Waal | |
| 7,624,215 B2 * | 11/2009 | Axford et al. | 710/260 |
| 7,730,248 B2 | 6/2010 | Goss et al. | |
| 7,739,533 B2 * | 6/2010 | Rauschmayer et al. | 713/322 |
| 7,945,875 B2 | 5/2011 | Anand et al. | |
| 7,954,078 B1 | 5/2011 | Wang et al. | |
| 8,327,173 B2 | 12/2012 | Hendin et al. | |
| 2001/0044909 A1 | 11/2001 | Oh et al. | |
| 2002/0126751 A1 | 9/2002 | Scheurich et al. | |
| 2002/0172008 A1 | 11/2002 | Michael | |
| 2003/0004921 A1 | 1/2003 | Schroeder | |
| 2003/0023825 A1 | 1/2003 | Woo et al. | |
| 2003/0204757 A1 * | 10/2003 | Flynn | 713/310 |
| 2003/0204761 A1 | 10/2003 | D'Alessio | |
| 2003/0206164 A1 | 11/2003 | Juenger | |
| 2003/0233525 A1 | 12/2003 | Reeves | |
| 2004/0076062 A1 | 4/2004 | Ueda et al. | |
| 2005/0015321 A1 | 1/2005 | Vindekilde | |
| 2005/0125705 A1 | 6/2005 | Cheng et al. | |
| 2006/0184808 A1 | 8/2006 | Chua-Eoan et al. | |
| 2006/0226895 A1 | 10/2006 | Hoshi et al. | |
| 2007/0206018 A1 | 9/2007 | Bajic et al. | |
| 2008/0016383 A1 | 1/2008 | Watanabe et al. | |
| 2008/0307240 A1 | 12/2008 | Dahan et al. | |
| 2009/0049220 A1 | 2/2009 | Conti et al. | |
| 2009/0054075 A1 | 2/2009 | Boejer et al. | |
| 2009/0204831 A1 | 8/2009 | Cousson et al. | |
| 2009/0210831 A1 | 8/2009 | Correale et al. | |
| 2009/0256607 A1 | 10/2009 | Smith et al. | |
| 2009/0271167 A1 | 10/2009 | Zhu et al. | |
| 2010/0064271 A1 | 3/2010 | Chen | |
| 2010/0308895 A1 | 12/2010 | Koushanfar et al. | |
| 2012/0054519 A1 | 3/2012 | Branover et al. | |
| 2012/0105452 A1 | 5/2012 | Diard | |

OTHER PUBLICATIONS

Application as Filed; U.S. Appl. No. 12/101,055; Tom Verveure; filed Apr. 10, 2008.

Application as Filed; U.S. Appl. No. 12/029,442; Brian Smith; et al., filed Feb. 11, 2008.

IEEE Journal of Solid-State Circuits, vol. 42, No. 1, Jan. 2007.

* cited by examiner

INTEGRATED CIRCUIT DEVICE HAVING POWER DOMAINS AND PARTITIONS BASED ON USE CASE POWER OPTIMIZATION

CROSS-REFERENCED RELATED APPLICATIONS

This application is related to the U.S. patent application "USE METHODS FOR POWER OPTIMIZATION USING AN INTEGRATED CIRCUIT HAVING POWER DOMAINS AND PARTITIONS", by Sririm et al., filed on Feb. 11, 2008, U.S. patent application Ser. No. 12/029,442.

FIELD OF THE INVENTION

The present invention is generally related to handheld digital computer systems.

BACKGROUND OF THE INVENTION

One of the important features of integrated circuits deigned for portable applications is their ability to efficiently utilize the limited capacity of the battery power source. Typical applications include cellular telephones and personal digital assistants (PDAs), which might have a Lithium ion battery or two AAA alkaline batteries as the power source. Users have come to expect as much as three to four weeks of standby operation using these devices. Standby operation refers to the situation where the cellular phone, handheld device, etc. is powered on but not being actively used (e.g., actively involved in a call). Generally, it is estimated that that the integrated circuits providing the functionality of the device is only performing useful work approximately 2% of the time while the device is in standby mode.

Removing the power supply from selected circuits of a device during standby is a technique employed by designers for battery powered applications. The technique is generally applied only to circuit blocks outside of the central processing unit (CPU). A primary reason for not applying this technique to CPUs, has been the difficulty in being able to retain the current processor state information necessary to continue execution after coming out of the standby mode. One solution for this limitation involves saving the current processor state information to external storage mechanisms (e.g., such as flash memory, a hard disk drive, etc.). In such a case there is the overhead required in transferring the state to and from the external storage mechanism. Even if the battery powered device had a hard disk drive, and many don't, the time consuming state transfer may not meet the real time response requirements of the application when the device needs to wake up to respond to a new event.

Other solutions involve the use of specialized DRAM components that are configured to maintain their own refresh states. Such components incorporate mechanisms for refreshing volatile DRAM memory cells without interaction with external memory controllers, as would be the case where a memory controller shuts down during sleep mode. As with saving CPU state, another solution would be to transfer the contents of volatile DRAM to non-volatile memory (e.g., Flash, disk storage, etc.) prior to entering sleep mode.

Power consumption during active mode is another important feature, particularly for battery-powered band held electronic devices. In addition to the problems involved in placing a system into sleep mode and reliably waking the system upon exit from sleep mode, there have been a variety of different efforts to reduce power consumption during the active modes of device operation. Such efforts include, for example, utilizing specialized low-power processors that are specifically configured for battery-powered handheld devices. Unfortunately, "low-power" processors are often "low performance" processors, which force compromises on the usability and the responsiveness of the user experience.

Thus, what is needed is a solution for powering down an electronic device for reduced standby power consumption while retaining the ability to quickly resume full power operation. What is further needed is a solution for reducing the power consumption of an electronic device while the device is actively executing a user application.

SUMMARY OF THE INVENTION

Embodiments of the present invention provide a solution for powering down an electronic device for reduced standby power consumption while retaining the ability to quickly resume full power operation. Embodiments of the present invention further provide a solution for reducing the power consumption of an electronic device while the device is actively executing a user application.

In one embodiment, the present invention is implemented as a programmable SoC (system on a chip) having optimized power domains and power islands. The SoC is an integrated circuit device that includes a plurality of power domains. Each of the power domains is coupled to its own respective voltage rail to supply power to the power domain. A plurality of power islands are also included within the integrated circuit device, wherein each power domain includes at least one power island. A power island typically comprises a set of components (e.g., sequential logic, storage elements, interconnects, etc.) that can be power gated with respect to the power domain. A plurality of functional blocks are included within the integrated circuit device, wherein each power island includes at least one functional block. Each functional block typically comprises special-purpose logic, storage, hardware resources, and the like. The hardware comprising the functional block is configured to provide a specific device functionality.

The integrated circuit device optimizes performance versus power consumption by intelligently adjusting power consumption in relation to a requested device functionality. Typical requested device functionality can include, for example, applications such as MP3 playing (e.g., music files, albums, audio books, etc.), video playing (e.g., MPEG-2 video, etc.), 3-D gaming, GPS navigation, and the like. To provide the requested device functionality, only those functional blocks that are needed are turned on and used. Unneeded functional blocks are shut down. For example, unneeded functional blocks can be shut down by individually turning off power to a selected one or more power domains. Additionally, for each turned on power domain, power gating can be individually applied to one or more power islands.

An objective of embodiments of the present invention is to shut down unneeded functional blocks in such a manner as to minimize leakage current. The power consumption of a given functional block will vary depending upon its state. For example, when a domain is turned off, power to that domain as provided by its dedicated voltage rail is turned off, and functional blocks within the domain are shut down and have very little leakage current. In a second case, when a domain is turned on but an island within the domain is shut down via power gating, the functional blocks within the island will have somewhat more leakage current than the case where the entire domain is shut down. A third case is where a power domain is turned on, an island within the power domain is turned on, but a functional block within the island is turned off via clock gating. In this state, the functional block within the island will have full leakage current.

In this manner, depending upon a particular use case scenario (e.g., MP3 player, cell phone, video player, 3-D gaming, GPS navigation, or the like) certain functional blocks can be turned on while other functional blocks are shut down. This allows the SoC integrated circuit device to optimize power consumption in accordance with the particular application being supported, thereby maximizing battery life and overall device usability.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
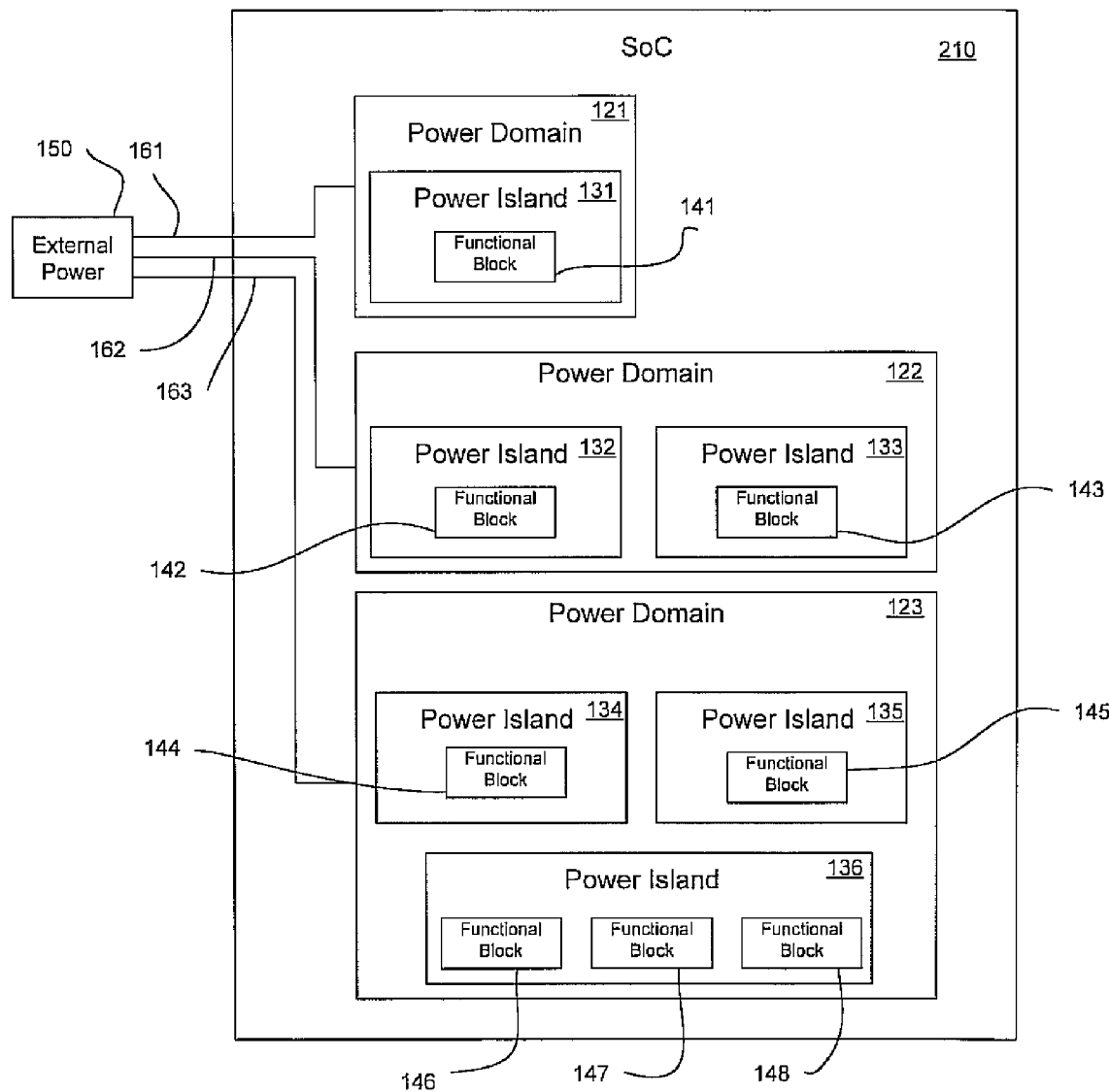
FIG. 1 shows a diagram of an exemplary generalized system architecture in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.
Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device (e.g., system 100 of FIG. 1), that manipulates and transforms data represented as physical (electronic) quantities within the computer system's registers and memories into other data similarly represented as physical quantities within the computer system memories or registers or other such information storage, transmission or display devices.

FIG. 1 shows a diagram of an exemplary generalized system architecture 100 in accordance with one embodiment of the present invention. As depicted in FIG. 1, system 100 includes a programmable SoC (system on a chip) integrated circuit device 110 which includes a plurality of power domains 121-123.

The SoC 110 includes an architecture that is optimized along multiple power domains and multiple power islands within the power domains to enable a customized and optimized power consumption versus performance profile. In the FIG. 1 embodiment, each of the power domains 121-123 are coupled to a dedicated voltage rail 161-163. This allows power to be supplied to one power domain independently with respect to the other power domains. The voltage rails 161-163 are individually powered by an external power source 150.

Each of the power domains 121-123 includes at least one power island. The power islands 131-136 are shown. The power islands are configured to receive power from the particular power domain in which they reside. Power islands are distinguished from power domains, in part, by the characteristic that power islands are not supplied their own dedicated voltage rail.

A power island typically comprises a set of components (e.g., sequential logic, storage, interconnects, etc.) that can be power gated with respect to the power domain. As used herein, power gating refers to the connecting or disconnecting of a power island to or from the power circuits of a power domain. The connecting and disconnecting is typically implemented using CMOS gating logic.

Each of the power islands 131-136 include one or more functional blocks. The functional blocks 141-148 are shown. More than one functional block can reside within a given power island, such as, for example, the power island 136 which includes the three functional blocks 146-148. The functional blocks draw their power from the circuits of the power island in which they reside. When a power island is shut down (e.g., via power gating), each of the functional blocks that are within that power island are also shut down. When a particular power island is on, one or more functional blocks within that power island can be shut down by clock gating. Clock gating refers to turning off a clock signal provided to the components and circuits of the functional block. Thus, for example, within the power island 136, the functional block 146 and 147 can be on, while the functional block 148 is shut down via clock gating.

Each functional block typically comprises special-purpose logic, storage, hardware resources, and the like that is configured to provide a specific device functionality. Each of the functional blocks 141-148 are purposely designed and optimized to excel at accomplishing a block specific intended task. The intended tasks are sufficiently granular such that particularly demanding tasks can be performed by using a greater number of functional blocks, while comparatively simple tasks can be performed by using a lesser number of functional blocks. For example, some tasks may only require a single functional block for implementation.

The integrated circuit device 100 optimizes performance versus power consumption by intelligently adjusting power consumption in relation to a requested device functionality. Typical requested device functionality can include, for example, applications such as MP3 playing, video playing, 3-D gaming, GPS navigation, and the like. As described above, each of the functional blocks 141-148 are optimized to accomplish a block specific intended task. Depending upon the particular requested device functionality, certain ones of the functional blocks 141-148 are turned on and their tasks are collectively used to fulfill the requested device functionality.

To provide the requested device functionality, only those functional blocks that are needed are turned on and used. Those functional blocks that are needed will consume power from their respective power islands, which in turn will consume power from their respective power domains. Unneeded functional blocks are shut down. These unneeded functional blocks can be shut down by clock gating, can be shut down by power gating their respective power islands, or can even be shut down by turning off their respective power domain.

Thus, for example, to implement a comparatively simple requested device functionality (e.g., display a clock on a display connected to the integrated circuit device 100) a single functional block can be utilized, such as the functional block 141. The other functional blocks can be shut down by turning off power to their respective power domains, such as shutting down the power domains 122 and 123 and turning off the voltage rails 162 and 163. As another example, to implement a comparatively demanding requested device functionality (e.g., playing a 3-D game) multiple functional blocks can be utilized, such as, the functional blocks 141, and 144-148. The other functional blocks 141-143 can be shut down by turning off power to the domain 122.

Accordingly, one objective of embodiments of the present invention is to shut down unneeded functional blocks when accomplishing particular requested device functionality. In this manner, depending upon a particular use case scenario (e.g., MP3 player, cell phone, video player, 3-D gaming, GPS navigation, or the like) certain functional blocks can be turned on while other functional blocks are shut down. This allows the SoC integrated circuit device to optimize power consumption in accordance with the particular application being supported, thereby maximizing battery life and device usability.

It should be noted that power consumption of a given functional block will vary depending upon its state. For example, in one case when a domain is turned off, power to that domain as provided by its dedicated voltage rail is turned off. In this state, functional blocks within the domain are shut down and have very little leakage current. This is in comparison to a second case when a domain is turned on but an island within the domain is shut down via power gating. In this state, the functional blocks within the island will have somewhat more leakage current than the case where the entire domain is shut down. In a third case, a power domain is turned on, an island within the power domain is turned on, but a functional block within the island is turned off via clock gating. In this state, the functional block within the island will have full leakage current. This is in comparison to the fully active case, where the functional block is turned on and is executing its intended function. In this state, the functional block will have its full leakage current and its full switching current.

Thus, the individual functional blocks that make up the functionality of each power island are particularly selected to maximize power efficiency in terms of which circuits can be shut-down when not needed. For each of the range of intended device functions, particular functional tasks required to implement these functions have been divided among particular hardware functional blocks so that there is reduced overlap in the hardware. This enables the intelligent adjustment and placement of a dividing line that cuts commonly used HW from commonly shut-down HW. The placement of this line will shift based on the execution of various device functions. These different intended device functions are referred to as use case scenarios. Depending upon the use scenario, different functional blocks will be unneeded, and lie unneeded hardware is shut down.

It should be noted that the partitioning of device functionality into the various functional blocks 141-148 enables the partitioning of IO resources that support each block. The partitioning of IO resources allows the disabling of blocks of IO components (e.g., IO pads, storage elements, buffers, etc.) that are not required for the use case running. IO resources can be partitioned into different groups aligned along the functional blocks that can be independently controlled or grouped to minimize power rail support. Thus, when performing a comparatively non-demanding function (e.g., MP3 playback) only a small subset of the IO resources are powered.

It should be noted that one or more of the power islands 131-136 can include non-power gated functional blocks. In the present embodiment, the term "non-power gated functions" refers to the characteristic that a given power island does not include any power gating logic or components for turning off ice island when the respective domain is on. This characteristic allows certain functional blocks that tend to be used across most use case scenarios to be consolidated into one or more non-power gated functional blocks. Non-power gated islands are described in greater detail below in the discussions of FIG. 2 and FIG. 3.

It should be noted that in one embodiment, voltage levels for one or more of the power islands 131-136 can be independently controlled. This allows the power of the different functional blocks to be matched to usage requirements while minimizing leakage. For example, a given voltage level can be chosen to facilitate the maximum instantaneous performance requirement or have small enough latency in increasing this voltage level that the unit can respond to a higher performance request quickly enough to hide any voltage ramp latency from user perception. Such regions of independent voltage level control can be referred to as voltage domains.

Figure 2:
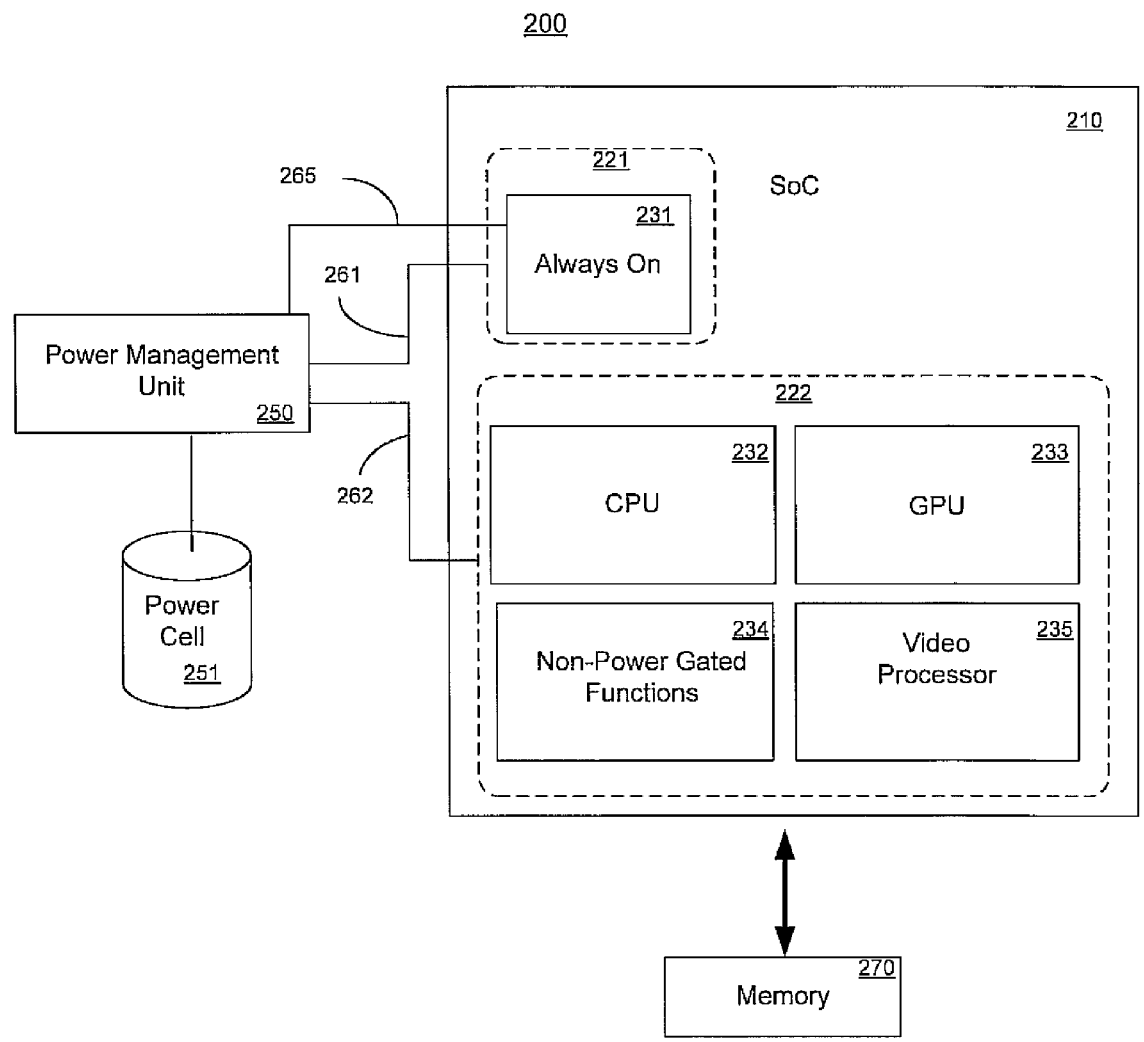
FIG. 2 shows a diagram of an exemplary targeted system architecture in accordance with one embodiment of the present invention.

FIG. 2 shows a diagram of an exemplary targeted system architecture 200 in accordance with one embodiment of the present invention. As depicted in FIG. 2, system 200 includes a programmable SoC integrated circuit device 210 which includes a two power domains 221 and 222. The power domain 221 includes an "always on" power island 231. The power domain 222 includes a CPU power island 232, a GPU power island 233, a non-power gated functions island 234, and a video processor island 235.

The FIG. 2 embodiment of the system architecture 200 is targeted towards the particular intended device functions of a battery-powered handheld SoC integrated circuit device. The SoC 210 is coupled to a power management unit 250, which is in turn coupled to a power cell 251 (e.g., one or more batteries). The power management unit 250 is coupled to provide power to the power domain 221 and 222 via the dedicated power rail 261 and 262, respectively. The power management unit 250 functions as a power supply for the SoC 210. The power management unit 250 incorporates power conditioning circuits, voltage pumping circuits, current source circuits, and the like to transfer energy from the power cell 251 into the required voltages for the rails 261-262.

The always on power island 231 of the domain 221 includes functionality for waking up the SoC 210 from a sleep mode. For example, in one embodiment, the always on domain 221, is configured to consistently have power applied to its constituent circuits. For example, the constituent circuits of the power domain 221 can be configured to draw power from the voltage rail 261 and to receive a clock signal in an uninterrupted manner. This enables the power domain 221 to execute sequential state machine logic, instructions, etc. while the rest of the SoC 210 is powered down. This can allow, for example, an internal state machine within the power domain 230 to detect wake event signals, the signals indicating a wake up from the sleep mode. For example, in a deep sleep mode, the voltage rail 262 and the domain 222 can be shut down. The components of the always on domain 221 will remain active, waiting for a wake-up signal.

The CPU power island 232 is within the domain 222. The CPU power island 232 provides the computational hardware resources to execute the more complex software-based functionality for the SoC 210. Such software functionality includes executing the operating system software, specific application software, and the like. Additionally, the CPU power island 232 executes special interrupt handling software that helps the SoC 210 respond to external events.

The GPU power island 233 is also within the domain 222. The GPU power island 293 provides the graphics processor hardware functionality for executing 3-D rendering functions. The three rendering functions include rendering real-time 3-D images as produced by a gaming application, rendering 3-D symbology as used by a mapping application, and the like.

The video processor island 235 is also within the domain 222. The video processor island 235 provides specialized video processing hardware for the encoding of images and video. The hardware components of the video processor island 235 are specifically optimized for performing real-time video encoding, which can be a computationally intensive task. Additionally, the video processor island 235 can also incorporate hardware specifically tailored for decompressing and rendering high-definition video. In the present embodiment, all modules that are used for video capture are included in the video processor island 235, including the image processing functional blocks that convert the data received from an image capture sensor (e.g., image capture device 607 of FIG. 6) that converts it into pixel data and ready for encoding.

The non-power gated functions island 234 is also within the domain 222. In the present embodiment, the term "non-power gated functions" refers to the characteristic that the island 234 does not include any power gating logic or components for turning off the island 234 when the domain 222 is on. Consequently, whenever the domain 222 is on, the non-power gated functions island 234 is also on. This characteristic allows the non-power gated functions island 234 to consolidate those hardware functions that tend to be common across the different use case scenarios of the SoC 210. For example, across the range of intended device functions, certain components will tend to always be needed. These components can be concentrated within the non-power gated functions island 234, and thereby simplify the implementation of the other islands 232, 233, and 235.

The memory 230 is an external memory that is coupled to the SoC 210. The memory 230 provides the execution environment for the CPU island 232. In typical usage scenarios, the operating system software and/or application software is instantiated within the memory 230. In one embodiment, the memory 230 is implemented as a specialized DRAM that can enter a self refresh mode. In such an embodiment, the volatile memory 230 can be set to self refresh and thereby maintain its content independent of the memory controller as the SoC 210 is placed into sleep mode.

Figure 3:
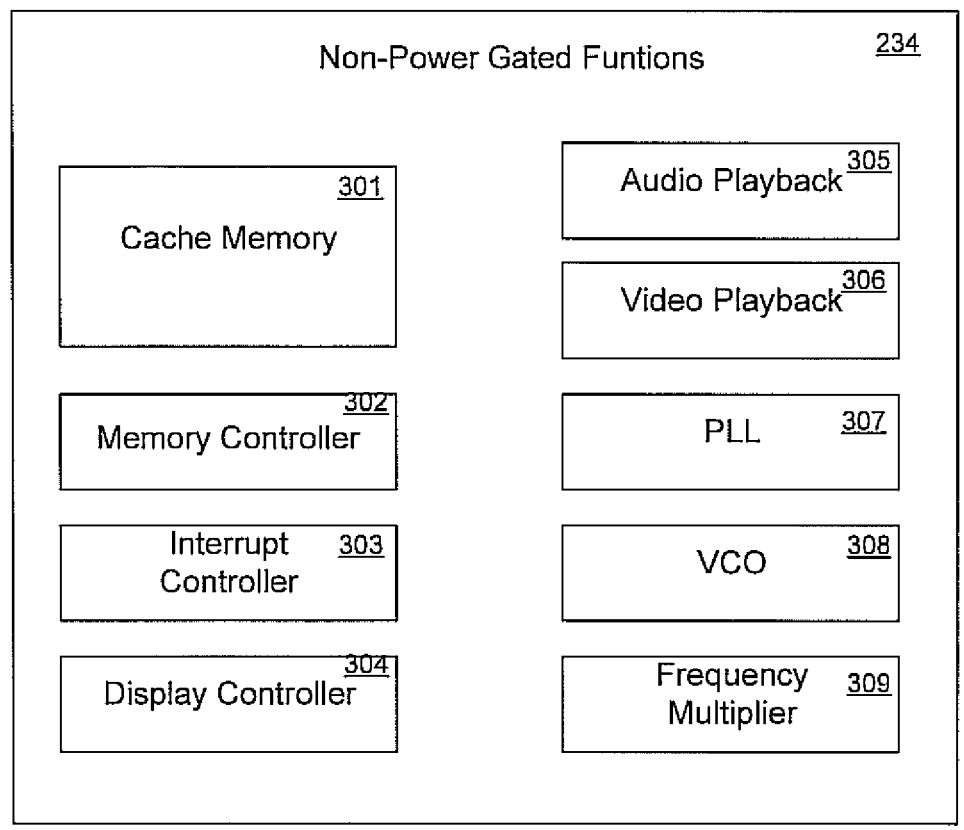
FIG. 3 shows a diagram illustrating the internal functional blocks of the non-power gated functions island in greater detail in accordance with one embodiment of the present invention.

FIG. 3 shows a diagram illustrating the internal functional blocks of the non-power gated functions island 234 in greater detail in accordance with one embodiment of the present invention. As depicted in FIG. 3, the non-power gated functions 234 includes a cache memory 301, a memory controller 302, and interrupt controller 303, a display controller 304, and audio playback unit 305, a video playback unit 306, a PLL 307, a VCO 308, and a frequency multiplier 309.

As described above, the non-power gated functions island 234 is intended to consolidate those hardware functions that tend to be common across the different use case scenarios. Thus, although the components 301-309 are shown, these components are not exhaustive and are not intended to limit variations or readily implemented optimizations which may be utilized with different embodiments of the present invention. In the FIG. 3 embodiment, the components 301-309 are chosen for inclusion within the non-power gated functions island 234 because they tend to be commonly used in the battery-powered handheld user applications envisioned.

The cache memory 301 provides low latency memory for the CPU (e.g., CPU 232). The cache memory 301 is included within the non-power gated island 234 to enable the CPU island 232 to be shut down while the cache memory 301 maintains power, and thus retains its contents. This significantly reduces the latency experienced by the SoC 210 when waking up the CPU island 232 from sleep. The memory controller 302 is included in the island 234 to manage the contents of the cache 301 and the interaction between the cache 301 and the external memory 270.

The interrupt controller 303 is included in the island 234 to reduce latency in responding to interrupts from external events or from externally coupled peripheral devices (not shown). The interrupt controller 303 also allows the SoC 210 to respond to interrupts without necessarily waking up the CPU island 232. The display controller 304 allows the island 234 to economically drive simple displays without involving other islands of the SoC 210 (e.g., such as an external display showing a clock).

The audio playback functional block 305 is included in the island 234 to allow the playback of digital audio (e.g., MP3s, WMAs, and the like) without involving other islands of the integrated circuit device. Similarly, the video playback functional block 306 is included in the island 234 to allow the playback of digital video without having to wake up the video processor island 235 or the CPU island 232. This enables certain low-impact digital video to be played using the smaller hardware resources of the video playback functional block 306. In comparison, real-time video encoding is a much more demanding process, and applications requiring this functionality require the full active use of the video processor island 235.

The PLL (phase locked loop), VCO (voltage controlled oscillator), and frequency multiplier functional blocks 307-

309 are also included in the island 234 to provide the clock signals and the like necessary for the operation of the functional blocks 301-306.

Figure 4:
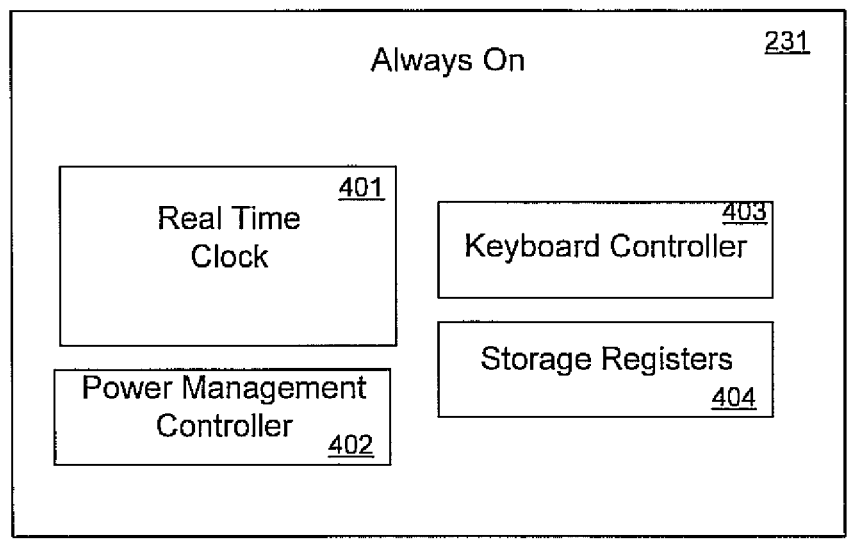
FIG. 4 shows the functional blocks of the always on island in accordance with one embodiment of the present invention.

FIG. 4 shows the functional blocks 401-404 of the always on island 231 in accordance with one embodiment of the present invention. As depicted in FIG. 4, the always on island 231 includes a real-time clock functional block 401, a power management controller functional block 402, a keyboard controller functional block 403, and storage registers functional block 404.

The real-time clock functional block 401 provides a time reference for the SoC 210. This allows, for example, the scheduling of wale events to occur at some point in future, or the use of watchdog timers to keep track of certain device operation. The power management controller functional block 402 interfaces with and controls the power management unit 250 (e.g., shown in FIG. 2). The power management controller executes the state machine that recognizes wake-up signals and wakes up the other power domain 222 and power islands 232-235 of the SoC 210.

The keyboard controller functional block 403 is configured to interface with external keyboard hardware that may be coupled to the SoC 210. The keyboard controller functional block 403 can, for example, recognize the press of a button on the keyboard and interpret the press as a wake signal. The storage registers functional block 404 provides a storage space for saving state from the other power islands 232-235 which would otherwise be lost when they are shut down.

Figure 5:
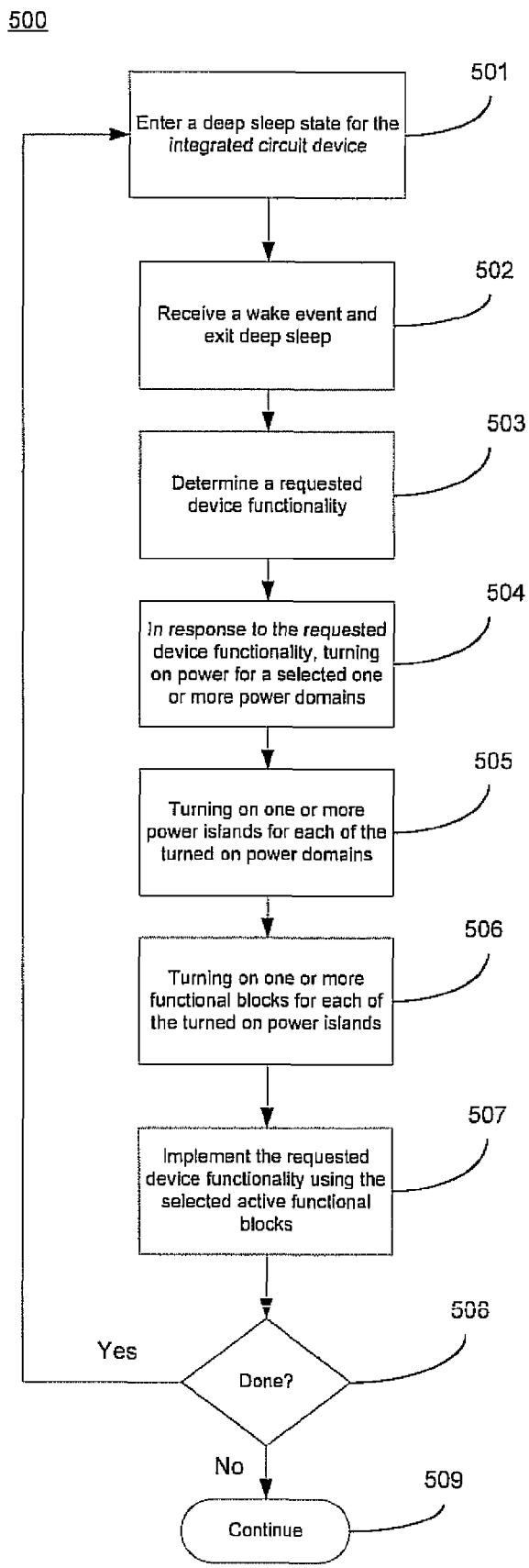
FIG. 5 shows a flow chart of the steps of a process in accordance with one embodiment of the present invention.

FIG. 5 shows a flow chart of the steps of a process 500 in accordance with one embodiment of the present invention. As depicted in FIG. 5, process 500 shows the operating steps of a power consumption use case optimization process for an integrated circuit device having selectable power domains and selectable power islands.

Process 500 begins in step 501, where it is assumed that the integrated circuit device (e.g., SoC 210 from FIG. 2) is powered on and is currently idle and in a deep sleep mode. As described above, when in standby and not performing any work for the user, the integrated circuit device will enter a deep sleep mode for minimum power consumption. In deep sleep mode, the core power domain of the device (e.g., domain 222) is shut down and its associated voltage rail deactivated. The only components on the device receiving power are within the always on power domain (e.g., always on domain 221).

In step 502, the always on domain receives a wake event. As described above, the wake event can come from a number of different sources. One source could be the user pressing a key on the keyboard. The key press will be detected by the keyboard controller functional block (e.g., keyboard controller functional block 403 of FIG. 4) and can be interpreted as a wake-up event. This causes a state machine executed by the power management controller functional block 402 to wake up the SoC 210 to respond to determine the appropriate response to the wake event.

In step 503, in response to the wake event, a determination is made as to what the requested device functionality is. The state machine within the always on domain determines whether it needs to turn on the core domain and thereby turn on the non-power gated island (e.g., non-power gated functions 234).

In step 504, the core domain (e.g., domain 222) is turned on. In step 505, the non-powered gated function island in the core domain is automatically turned on with the activation of the core domain.

In step 506, once the requested device functionality is determined, one or more functional blocks are turned on for the non-powered gated function island. For example, as described above, depending upon the requested device functionality, no further components need be activated (e.g., playback and MP3 song, display the current time, etc.). Thus, for example, if the users of the presses a button to restart his MP3 song, the non-power gated functions island can display the current song and begin audio playback, leaving the rest of the power islands turned off. In those cases where the requested device functionality is more complex, additional power islands are turned on and additional functional blocks are turned on.

In step 507, the requested device functionality is implemented by the selected activated functional blocks. As described above, only those hardware functional blocks that are needed to implement the requested device functionality are active. The other functional blocks are shut down.

Subsequently, as shown by steps 508 and 509, the activated functional blocks continue providing the requested device functionality until the application is complete. Then, for example, upon completion, the integrated circuit device will go back into the deep sleep mode where all domains are shut down except for the always on domain.

Figure 6:
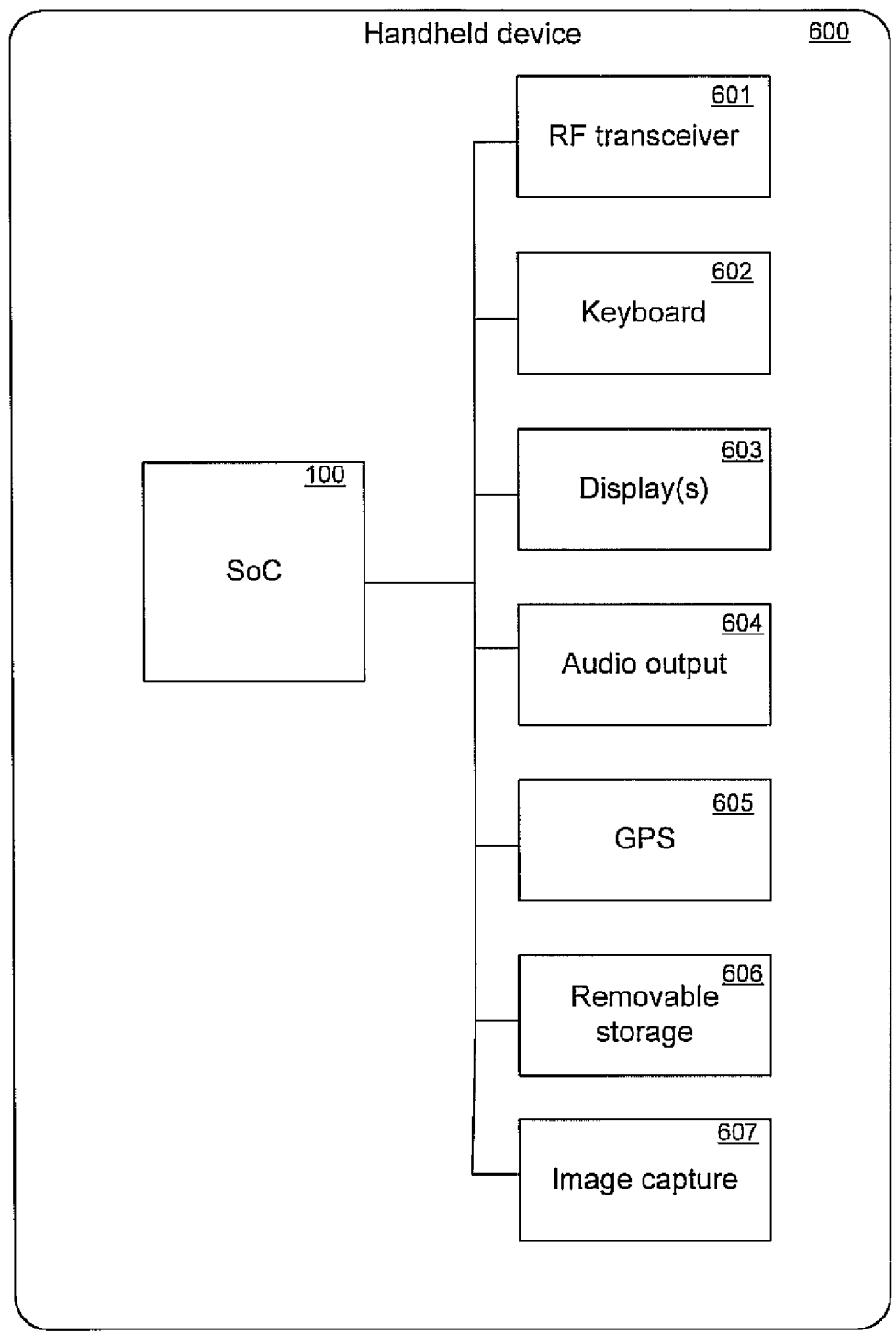
FIG. 6 shows a diagram of a handheld device in accordance with one embodiment of the present invention.

FIG. 6 shows a diagram of a handheld device 600 in accordance with one embodiment of the present invention. As depicted in FIG. 6, a handheld device 600 includes the system architecture 100 described above in the discussion FIG. 1. The handheld device 600 shows peripheral devices 601-607 that add capabilities and functionality to the device 600. Although the device 600 is shown with the peripheral devices 601-607, it should be noted that there may be implementations of the device 600 that do not require all the peripheral devices 601-607. For example, in an embodiment where the display(s) 603 are touch screen displays, the keyboard 602 can be omitted. Similarly, for example, the RF transceiver can be omitted for those embodiments that do not require cell phone capability. Furthermore, additional peripheral devices can be added to device 600 beyond the peripheral devices 601-607 shown to incorporate additional functions. For example, a hard drive or solid state mass storage device can be added for data storage, or the like.

The RF transceiver 601 enables two-way cell phone communication and RF wireless modem communication functions. The keyboard 602 is for accepting user input via button pushes, pointer manipulations, scroll wheels, jog dials, touch pads, and the like. The one or more displays 603 are for providing visual output to the user via images, graphical user interfaces, full-motion video, text, or the like. The audio output component 604 is for providing audio output to the user (e.g., audible instructions, cell phone conversation, MP3 song playback, etc.). The GPS component 605 provides GPS positioning services via received GPS signals. The GPS positioning services enable the operation of navigation applications and location applications, for example. The removable storage peripheral component 606 enables the attachment and detachment of removable storage devices such as flash memory, SD cards, smart cards, and the like. The image capture component 607 enables the capture of still images or full motion video. The handheld device 600 can be used to implement a smart phone having cellular communications technology, a personal digital assistant, a mobile video playback device, a mobile audio playback device, a navigation device, or a combined functionality device including characteristics and functionality of all of the above.

Exemplary Use Case Scenarios

A number of different exemplary use case scenarios for the SoC 210 are now described. Each of the below described use case scenarios involve a determination as to what the requested device functionality is and the tailoring of the active functional blocks of the integrated circuit device 210 to fulfill the requested device functionality. It should be noted that the below described scenarios does not constitute an exhaustive list, but are intended as illustrative examples and that other scenarios can be implemented.

Assume a web surfing scenario, where the user wants to surf different web sites using the device 210. In such a case, device 210 executes a web surfing application (e.g., Web browser, etc.) by using the CPU island 232, the non-power gated functions island 234, and the always on island 231. The GPU island 233 and the video processor island 235 are shut down via power gating. In this scenario, the CPU island 232 is needed to execute a web browser and operating system support for the Web browser. The non-power gated functions 234 is needed to drive a coupled display (e.g., display controller 304) and provide cache memory 301 and a memory controller 302 for the CPU, and the like.

Assume a 3-D imaging application scenario. In such a case, device 210 executes a 3-D imaging application (e.g., 3-D game, etc.) by using the CPU island 232, the non-power gated functions island 234, the GPU island 233, and the always on island 231. The video processor island 235 is shut down via power gating. In this scenario, the CPU island 232 is needed to execute the 3-D image application and operating system support. The non-power gated functions 234 is needed to drive a coupled display (e.g., display controller 304) and provide cache memory 301 and a memory controller 302 for the CPU, and the like. The GPU island 233 is needed to provide dedicated 3-D rendering support.

Assume a camcorder application scenario. In such a case, device 210 executes a camcorder imaging application (e.g., real-time video capture, etc.) by using the CPU island 232, the non-power gated functions island 234, the video processor island 235, and the always on island 231. The GPU island 233 is shut down via power gating. In this scenario, the CPU island 232 is needed to execute the camcorder image application and operating system support. The non-power gated functions 234 is needed to drive the coupled display and provide cache memory 301 and memory controller 302 for the CPU, and provide video playback functional block 306 to provide video playback support. The video processor island 235 is needed to provide real-time full-motion video encoding.

Assume a video playback application scenario. In such a case, device 210 executes a video playback application (e.g., playback a stored MPEG video, etc.) by using the non-power gated functions island 234 and the always on island 231. The CPU island 232, the GPU island 233, and the video processor island 235 are shut down via power gating. In this scenario, the non-power gated functions 234 drives the coupled display and the video playback functional block 306 provides video playback support.

Assume an audio playback application scenario. In such a case, device 210 executes an audio playback application (e.g., playback a stored MP3 file, etc.) by using the non-power gated functions island 234 and the always on island 231. The CPU island 232, the GPU island 233, and the video processor island 235 are shut down via power gating. In this scenario, the non-power gated functions 234 drives the coupled display and the audio playback functional block 305 provides audio playback support.

Assume a cell phone application scenario. In such a case, device 210 executes a cell phone application (e.g., real-time two-way voice communication, etc.) by using the CPU island 232, the non-power gated functions island 234, and the always on island 231. The GPU island 233 and the video processor island 235 are shut down via power gating. In this scenario, the CPU island 232 is needed to provide operating system support for the cell phone application. The non-power gated functions 234 is needed to drive the coupled display and provide cache memory 301 and memory controller 302 for the CPU.

Assume a GPS navigation scenario. In such a case, device 210 executes a GPS navigation application (e.g., GPS interface with mapping software, etc.) by using the CPU island 232, the non-power gated functions island 234, the GPU island 233, and the always on island 231. The video processor island 235 is shut down via power gating. In this scenario, the CPU island 232 is needed to execute the GPS navigation application and mapping application and provide operating system support. The non-power gated functions 234 is needed to drive the coupled display and provide cache memory 301 and memory controller 302 for the CPU. The GPU island 233 is needed to model 3-D symbology and move mapping images in three dimensions.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A programmable SoC (system on a chip) comprising:
an integrated circuit device;
a plurality of power domains included within the integrated circuit device, each of the power domains having a respective voltage rail to supply power to the power domain;
a plurality of power islands included within the integrated circuit device, wherein each power domain includes at least one power island;
a plurality of functional blocks included within the integrated circuit device, wherein each power island includes at least one functional block, and wherein each functional block is configured to provide a specific device functionality,
wherein the integrated circuit device is configured to adjust power consumption in relation to a requested device functionality by:
individually turning on or turning off power to one or more selected power domains;
individually power gating one or more selected power islands within a turned on power domain; and
individually enabling one or more selected function blocks based on the requested device functionality within a turned on power island.

2. The programmable SoC of claim 1, wherein each of the plurality of power domains is coupled to a dedicated voltage rail, and wherein the integrated circuit device is configured to receive power from an external power management unit adapted to provide power for the respective voltage rails.

3. The programmable SoC of claim 1, wherein the plurality of functional blocks are allocated among the plurality of power islands to enable a first subset of functional blocks to be power gated when providing a first requested device functionality and to enable a second subset of functional blocks to be power gated when providing a second requested device functionality.

4. The programmable SoC of claim 1, wherein the plurality of power islands are allocated among the plurality of power domains to enable a first subset of power islands to be turned off when providing a first requested device functionality and to enable a second subset of power islands to be turned off when providing a second requested device functionality.

5. The programmable SoC of claim 1, wherein the plurality of power domains comprises an always on power domain configured to control turning power off and turning power on for a remaining plurality of power domains of the integrated circuit device, wherein the integrated circuit device is operable to enter a deep sleep mode while the always on power domain remains active.

6. The programmable SoC of claim 5, wherein the always on power domain is configured to control the power gating of the one or more selected power islands.

7. The programmable SoC of claim 5, wherein the always on power domain is configured to control clock gating of the one or more selected functional blocks.

8. The programmable SoC of claim 7, wherein the always on power domain is coupled to control an external power management unit adapted to provide power for the respective voltage rails, and to turn off a voltage rail associated with a turned off power domain and to turn on a voltage rail associated with a turned on power domain.

9. The programmable SoC of claim 5, wherein the always on power domain is configured to:
receive a wake-up signal indicative of a wake up from the sleep mode;
determine the requested device functionality; and
identify the one or more selected function blocks for performing the requested device functionality.

10. The programmable SoC of claim 9, wherein the power domain comprises an internal state machine configured to detect the wake-up signal.

11. A battery-powered handheld device, comprising:
a programmable system on a chip integrated circuit device;
a plurality of power domains included within the integrated circuit device, each of the plurality of power domains having a respective voltage rail to supply power to the power domain, wherein one of the plurality of power domains is an always on power domain and is configured to:
remain active while the integrated device is in a sleep mode; and
control turning power off and turning power on for a remaining plurality of power domains;
a plurality of power islands included within the integrated circuit device, wherein each power domain includes at least one power island;
a plurality of functional blocks included within the integrated circuit device, wherein each power island includes at least one functional block, and wherein each functional block is configured to provide a specific device functionality,
wherein the integrated circuit device is configured to adjust power consumption in relation to a requested device functionality by:
individually turning on or turning off power to one or more selected power domains of the plurality of domains;
individually power gating one or more selected power islands within a turned on power domain; and
individually enabling one or more selected function blocks within a turned on power island based on the requested device functionality.

12. The device of claim 11, wherein the plurality of functional blocks are allocated among the plurality of power islands to enable a first subset of functional blocks to be power gated when providing a first requested device functionality and to enable a second subset of functional blocks to be power gated when providing a second requested device functionality.

13. The device of claim 11, wherein the plurality of power islands are allocated among the plurality of power domains to enable a first subset of power islands to be turned off when providing a first requested device functionality and to enable a second subset of power islands to be turned off when providing a second requested device functionality.

14. The device of claim 13, wherein the always on power domain is configured to control the power gating of the one or more selected power islands and is configured to control clock gating of the one or more selected functional blocks.

15. The device of claim 11, wherein the always on power domain is configured to control an external power management unit adapted to provide power for the respective voltage rails, and to turn off a respective voltage rail associated with a turned off power domain and to turn on a respective voltage rail associated with a turned on power domain.

16. The device of claim 11, wherein the plurality of functional blocks are allocated among the plurality of power islands and the plurality of power domains of the integrated circuit device to optimize power consumption by enabling one or more functional blocks to be shut down when not needed for the requested device functionality.

17. A handheld smart phone, comprising:
an RF transceiver;
a keyboard;
a display;
an audio output device;
a programmable system on a chip integrated circuit device coupled to the RF transceiver, the keyboard, the display, and the audio output device;
a plurality of power domains included within the integrated circuit device, each of the plurality of power domains having a respective voltage rail to supply power to the power domain, wherein one of the plurality of power domains is an always on power domain and is configured to:
remain active while the integrated device is in a sleep mode; and
control turning power off and turning power on for a remaining plurality of power domains;
a plurality of power islands included within the integrated circuit device, wherein each power domain includes at least one power island;
a plurality of functional blocks included within the integrated circuit device, wherein each power island includes at least one functional block, and wherein each functional block is configured to provide a specific device functionality; and
wherein the integrated circuit device is configured to adjust power consumption in relation to a requested device functionality by:
individually turning on or turning off power to one or more selected power domains;
for each turned on power domain, individually power gating one or more selected power islands; and individually clock gating one or more selected function blocks based on the requested device functionality within a turned on power island.

18. The handheld smart phone of claim 17, wherein the plurality of functional blocks are allocated among the plurality of power islands to enable a first subset of functional blocks to be power gated when providing a first requested device functionality and to enable a second subset of functional blocks to be power gated when providing a second requested device functionality.

19. The handheld smart phone of claim 17, wherein the always on power domain is configured to control an external power management unit adapted to provide power for the respective voltage rails, and to turn off a respective voltage rail for a turned off power domain and to turn on a respective voltage rail for a turned on power domain.

20. The handheld smart phone of claim 17, wherein the plurality of functional blocks are allocated among the plurality of power islands and plurality of the power domains of the integrated circuit device to optimize power consumption by enabling one or more functional blocks to be shut down when not needed for the requested device functionality.

21. The handheld smart phone of claim 17, further comprising a power management controller residing in the always on power domain and configured to execute a state machine operable to recognize wake-up signals and wakes up power domains or power islands.

22. The handheld smart phone of claim 17, wherein multiple power domains and multiple power islands within the plurality of power domains are used to enable a customized and optimized power consumption versus performance profile.

* * * * *